United States Patent
Hargis

(10) Patent No.: US 9,246,431 B2
(45) Date of Patent: Jan. 26, 2016

(54) METHOD OF OPTIMISING INPUT COMPONENTS

(71) Applicant: Control Techniques Limited, Newtown (GB)

(72) Inventor: Colin Hargis, Oswestry (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 337 days.

(21) Appl. No.: 13/875,873

(22) Filed: May 2, 2013

(65) Prior Publication Data

US 2013/0307457 A1 Nov. 21, 2013

(30) Foreign Application Priority Data

May 4, 2012 (GB) .................................. 1207989.3

(51) Int. Cl.
*H02P 7/00* (2006.01)
*H02P 29/00* (2006.01)
(52) U.S. Cl.
CPC .................................. *H02P 29/0088* (2013.01)
(58) Field of Classification Search
CPC .............................. H02P 29/0088; H02H 6/00
USPC .......................................................... 318/472
See application file for complete search history.

(56) References Cited

U.S. PATENT DOCUMENTS

| | | | | |
|---|---|---|---|---|
| 6,992,452 | B1 * | 1/2006 | Sachs et al. | 318/434 |
| 7,940,034 | B2 | 5/2011 | Pelz et al. | |
| 8,084,983 | B2 * | 12/2011 | Lee | 318/641 |
| 8,688,303 | B2 * | 4/2014 | Stevens et al. | 701/22 |

FOREIGN PATENT DOCUMENTS

| | | |
|---|---|---|
| EP | 2469710 | 6/2012 |
| JP | 2004229491 | 8/2004 |
| JP | 2012029457 | 2/2012 |
| WO | 2011/040845 | 4/2011 |
| WO | 2011/162318 | 12/2011 |

* cited by examiner

*Primary Examiner* — Eduardo Colon Santana
*Assistant Examiner* — Gabriel Agared
(74) *Attorney, Agent, or Firm* — Harness, Dickey & Pierce, P.L.C.

(57) ABSTRACT

A method of controlling a current flowing through a component of a drive comprising the steps of: estimating the current flowing through a component; estimating the temperature of the component; comparing the estimated temperature with a desired maximum temperature for the component; and adjusting the current flowing through the component based on the result of the comparing step.

18 Claims, 4 Drawing Sheets

METHOD OF OPTIMISING INPUT COMPONENTS

CROSS-REFERENCE TO RELATED APPLICATION

This application claims the benefit and priority of Great Britain Patent Application No. 1207989.3, filed May 4, 2012. The entire disclosure of the above application is incorporated herein by reference.

FIELD

The invention relates to controlling a current flowing through a component for optimizing input components of an inverter drive, in particular a variable speed drive. It is particularly suitable for, but by no means limited to low duty cycle applications such as those used with lifts, cranes or hoists.

BACKGROUND

Variable-speed inverter drives are typically used to control motor output where a fixed speed drive is less efficient or not as desirable. Often, applications of variable speed drives have an inherently variable and/or intermittent duty.

In order to save component cost, components having a thermal time constant comparable with or greater than the duty cycle time of the application can be chosen for the drive and control circuitry so as to make use of their intentional short-time overload capability.

In order to avoid damage to a drive or control component by inadvertent overloading, a component's temperature can be monitored by a temperature measuring device, and the variable-speed drive can be arranged to shut-down if the temperature becomes excessive. When stopped, the component is able to cool down under no-load conditions.

Alternatively, component temperature can be estimated using a suitable thermal model by way of other measurements, for example but not limited to the current in the component together with the temperature in the proximity of the component.

In addition to component choice due to thermal profile, systems installed in the European Union are required to meet Electromagnetic Compatibility (EMC) limits as to the line current harmonics generated by, for example, an input rectifier of the inverter drive, as well as radio frequency interference (RFI) emission. This typically requires the installation of a substantial input choke in either the d.c. link or a.c. input circuit of the inverter drive, and an RFI filter in the a.c. input circuit, both of which carry the input current and have to be suitably rated. Therefore, the rating of the components chosen to help meet EMC criteria is of significant influence on circuit complexity, performance and cost.

As explained above in relation to inadvertent overloading of the components of the drive and control circuitry, component temperature monitoring is performed. The additional components positioned for EMC/RFI reasons may also be a cause of a system shut-down due to overloading (overheating). Therefore, additional monitoring of these components is often undertaken which adds to the cost and complexity of a circuit.

With increasing worldwide awareness and associated regulation of Electromagnetic Compatibility (EMC) and the effect of power line harmonics on neighbouring electronic equipment, it is likely that the requirement for a system to operate within defined EMC limits will spread to other parts of the world.

Therefore, there is a need to balance component choice of an underlying circuit as well as additional EMC/RFI mitigating components based both on thermal characteristics as well as suitability for their EMC/RFI performance.

SUMMARY

An invention is set out in the claims.

According to a first aspect there is provided a method of controlling a current flowing through a component of a drive comprising the steps of estimating the current flowing through a component, estimating the temperature of the component, comparing the estimated temperature with a desired maximum temperature for the component, and adjusting the current flowing through the component based on the result of the comparing step.

This method may be applied to one or more components in serial or parallel.

With such a method, temperature sensors need not be added to each component of interest. This reduces implementation costs and does not degrade reliability due to potential sensor failure. An understanding of the duty of the application within which the drive is operating allows a better understanding of current flow through that component. Further, the component in question may be reduced in rating as data available within the drive is used to control the current through the component to avoid or mitigate an overheating scenario which avoids having to source a component with an excess rating.

Optionally, the step of estimating the current comprises sampling torque produced in a load, or current that produces torque in a load, driven by the drive.

Optionally, the step of estimating the current comprises sampling shaft speed of a motor driven by the drive.

Optionally, the step of estimating the current comprises sampling the output frequency of an inverter of the drive.

Optionally, the step of estimating the current comprises sampling the output voltage of an inverter of the drive.

Optionally, the step of estimating the current comprises multiplying the current that produces torque in a load by the shaft speed to provide an estimate of the input power of the motor driven by the drive.

Optionally, a scaling factor is applied to the result of the multiplication.

Optionally, the step of estimating the current further comprises applying a known relationship between input current of the drive and the input power of the motor.

Optionally, the step of estimating the current comprises measuring the current in a d.c. link of the drive.

Optionally, the step of estimating the temperature comprises estimating a temperature rise in the component based on the estimated current flowing through the component.

Optionally, the step of estimating the temperature is further based on ambient temperature.

Optionally, the step of adjusting the current comprises adjusting the output of an inverter of the drive.

Optionally, the step of adjusting the current comprises adjusting the output power of an inverter of the drive to adjust the input current of the inverter.

Optionally, adjusting the output of an inverter of the drive comprises restricting the speed of a motor driven by the drive.

Optionally, adjusting the output of an inverter of the drive comprises restricting the acceleration of the motor driven by the drive.

Optionally, adjusting the output of an inverter of the drive comprises restricting the torque of the motor driven by the drive.

According to a second aspect there is provided an apparatus for controlling a current flowing through a component of a drive comprising means for carrying out the above method. The means for may comprise a controller, and may further comprise an inverter wherein the controller is a controller of the inverter. The drive may be arranged to drive a motor, and the motor may be arranged to drive a hoist, crane or lift.

With all aspects, optional features are defined in the dependent claims.

It is noted that a 'lift' is also known as an 'elevator' in certain jurisdictions.

BRIEF DESCRIPTION OF THE DRAWINGS

Embodiments will now be described, by way of example only, and with reference to the drawings in which.

DETAILED DESCRIPTION

In an inverter drive for a motor comprising, for example, an a.c. source, a rectifier, a d.c. link and an output inverter for producing the required a.c. waveform at the motor, when the direction of flow of power is from the drive to the motor, the input current is a function of the output power, i.e. a function of the product of the torque and speed of the mechanical load. When the direction of power flow is from the motor to the drive, often referred to as 'overhauling' or 'regenerating', this returned power is typically dissipated in a braking resistor or similar, and the input current is then at or near zero.

For a particular group of applications, for example in drives for lifts, cranes and hoists, on average, about half of the active duty is with an overhauling load so that the input power is near to zero for at least half of the time of operation. In these applications, the output power, which is proportional to the product of torque and speed, may only be near to its maximum value for a fraction of the motoring cycle during acceleration when speed and torque are both close to their maximum values.

Due to the nature of an overhauling load in the low duty example applications of lifts, cranes and hoists, the duty of the input components of an inverter drive of these applications is typically considerably less than 50% of the nominal drive input rating. EMC components such as input line chokes and RFI filters, which have thermal time constants comparable to or longer than a typical journey cycle of lifts, cranes and hoists, can be reduced in current rating to take account of this reduced duty cycle. The reduction in component current rating can be substantial, and increased further because the power dissipated (and hence the heat produced) in such components is predominantly proportional to the square of the current, which in turn is proportional to the output power of the inverter drive. The input current is at or near zero for an overhauling load (i.e. zero dissipation), and, as will be explained in more detail later, for the initial stages of driving a load, although initial torque may be high, speed is low and hence output power is low (output power is proportional to torque x speed) which in turn renders a low input current flow through the input components.

Thus, a reduction in the current rating of such components is possible. In turn, this provides a reduction in the cost and size of components as well as a reduction in the consumption of materials such as copper because the power dissipated and hence the heat produced in such components is not as high as it may seem from a consideration of the intended maximum available output power.

Figure 1:
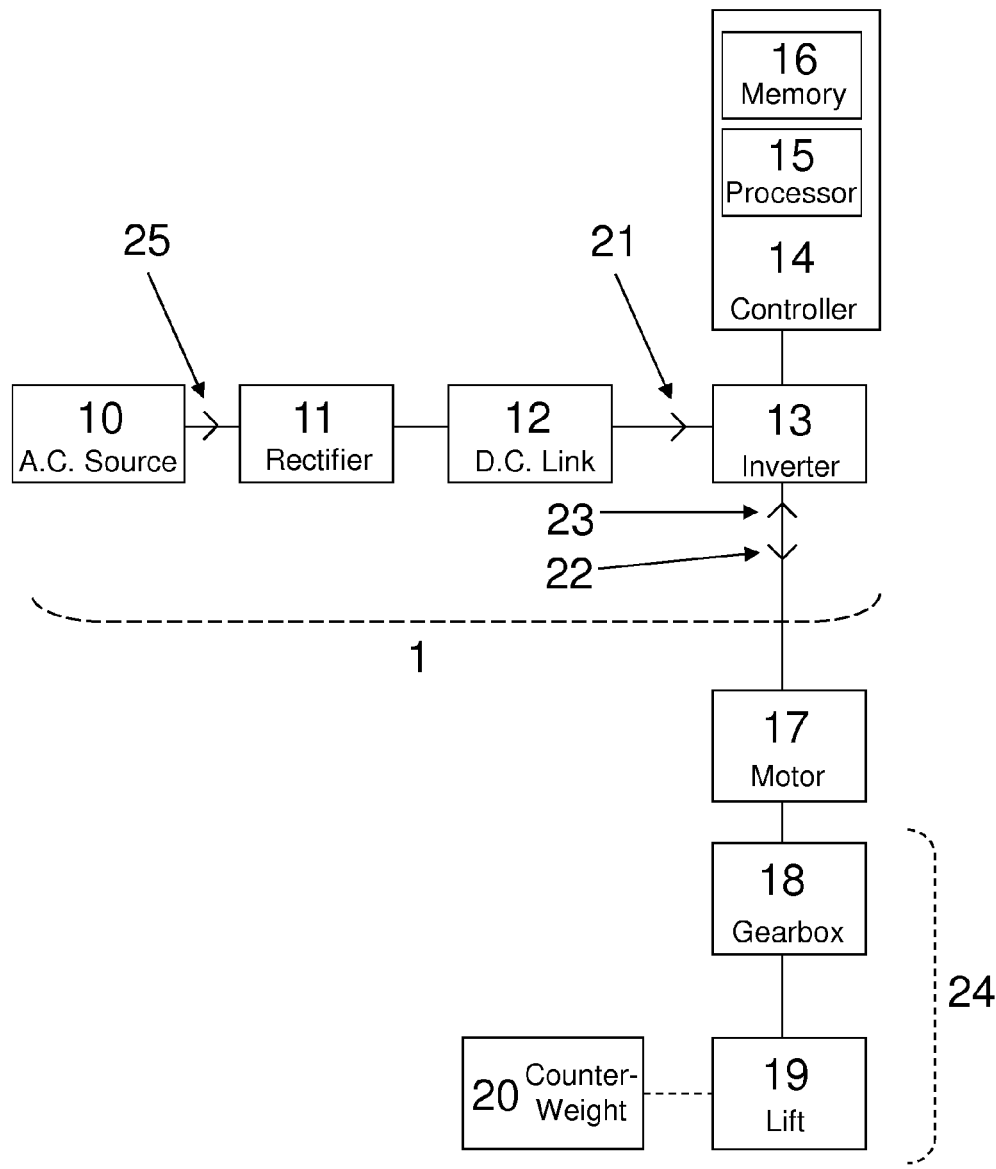
FIG. 1 illustrates a lift mechanism according to an embodiment.

Turning to FIG. 1, an inverter drive 1, which in this embodiment comprises an a.c. source 10, rectifier 11, d.c. link 12, output inverter 13 (under the control of controller 14 also comprising processor 15 and optionally memory 16) may drive a motor 17. Output inverter 13 has an input voltage, current and power (21) and an output voltage, frequency, current and power (22) when operational. Current is returned (23) from the motor when the motor is overhauling. In this embodiment, motor 17 is shown driving a lift mechanism 24 comprising gearbox 18, lift 19 and counter-weight 20. Motor 17 may alternatively drive a crane or hoist mechanism in the same manner. Alternatively, other arrangements of inverter drive, for example, those that utilise a d.c. source may be used.

Further, according to an embodiment, the inverter drive may be a variable-speed drive as would be understood by the skilled person. A suitable variable speed drive for driving a motor may comprise the following in any combination:

- An input rectifier 11 for converting the a.c. mains supply to d.c. where the rectifier is not capable of returning power from the d.c. circuit to the a.c. circuit 10.
- Associated input components such as switches, fuses, choke(s) and RFI filter. The choke(s) and RFI filter may be positioned for EMC purposes as discussed earlier.
- A d.c. smoothing circuit 12.
- An inverter 13 for converting the d.c. supply to a.c. at a frequency and voltage which are controlled by the controller 14 and arranged to generate the required torque and speed at the motor shaft. The inverter is capable of conveying power in either direction, i.e. from the d.c. circuit to the motor or the motor to the d.c. circuit.
- The controller 14 for the inverter 13 typically containing a microprocessor 15 and other circuits such as memory 15. The controller has access to various measured parameters such as currents and voltages (21, 22, 23) and may use this data for the operating/driving the motor.
- A braking resistor with control circuit, connected to the d.c. circuit, which absorbs returned power when the load is overhauling.

The duty of the various components of such a drive when driving a motor such as motor 17 can be summarised as follows:

- The input rectifier 11 and the associated input components carry a current (25) which is a function of the power delivered to the motor 17, for example the product of motor shaft torque and speed together with associated losses. When the load is overhauling (i.e. the motor is returning power to the inverter) the input current is at or near to zero.
- The inverter 13 carries a current which is a function of the torque developed in the motor, together with losses and motor magnetising current, regardless of the direction of power flow.

The d.c. smoothing circuit carries a current which is a complex function of the input (25) and output currents (22).

The braking circuit carries a current which is a function only of the power returned from the motor during overhauling, i.e. the product of shaft torque and speed less losses, during overhauling.

The control circuit operates continuously. In this context its power consumption is considered to be negligible.

Within a system such as that of FIG. 1, measures are taken to prevent over-heating of short-time rated components, caused for example by unexpectedly long or abnormal operational duties, or high ambient temperature etc. High ambient temperature may be present for a variety of reasons, for example, but not limited to a partially blocked drive cooling fan, loss of ventilation in the building or location, as well as exceptionally hot weather.

The addition of temperature sensors to such systems as well as connecting the sensors to the processor 15 of drive controller 14 or other intelligent controller would add cost and complexity to the system and is therefore not desired.

In known approaches as discussed in the background section, in the event over-heating in components of the inverter drive 1, a loss of availability of power to the driven motor occurs as the inverter drive is tripped, shut-down or disconnected, for example by disabling controller 14 upon detection of excessive temperature in a component. In present embodiments, in order to avoid a loss of availability of drive to the load when mitigating an overheating component, data that is available within the inverter drive 1 is processed by processor 15 of controller 14 and used to influence action of drive controller 14 with respect to how motor 17 is operated. The action of the drive controller 14 may be influenced in a staged fashion as follows:

(a) The motor torque and/or acceleration could be restricted. This would restrict the current in all parts of the inverter drive 1, and hence the overheating component(s) in question. Provided sufficient torque is developed to support the net load, i.e. allowing for the counterweight, then the only effect on the application (for example the lift, crane or hoist being operated) is to reduce the acceleration, giving a small increase in journey time.

This is because the peak power of a lift, crane or hoist is when under acceleration and approaching rated speed of the lift, crane or hoist. At that stage torque is supplied both to support the load of the lift, crane or hoist, and to accelerate the inertia. Once rated speed is attained, accelerating torque is no longer needed. Hence, restricting the torque does not lengthen the journey time substantially, it simply delays getting to top speed.

(b) If torque restriction alone is inadequate to mitigate the overheating component(s) then the motor speed could be restricted. This would reduce the current in the input stages of the inverter 13, when driving the motor, or the brake circuit, when the motor is overhauling, as well as the current in the d.c. smoothing circuit. Reducing the speed increases the journey time.

Alternatively, (b) could be carried out independently of (a).

Optionally, the processing functions may be carried out by a processor remote from the inverter drive controller that has access to the relevant data from the drive by way of a communications link such as a data bus or other wired or wireless link.

Figure 2:
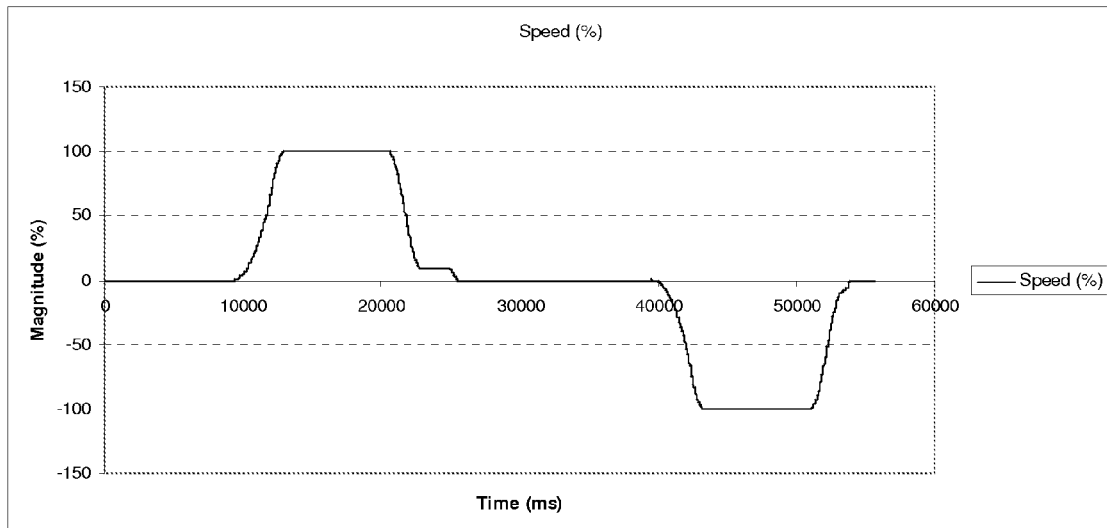
FIG. 2 illustrates motor shaft speed in a lift mechanism according an example.
Figure 3:
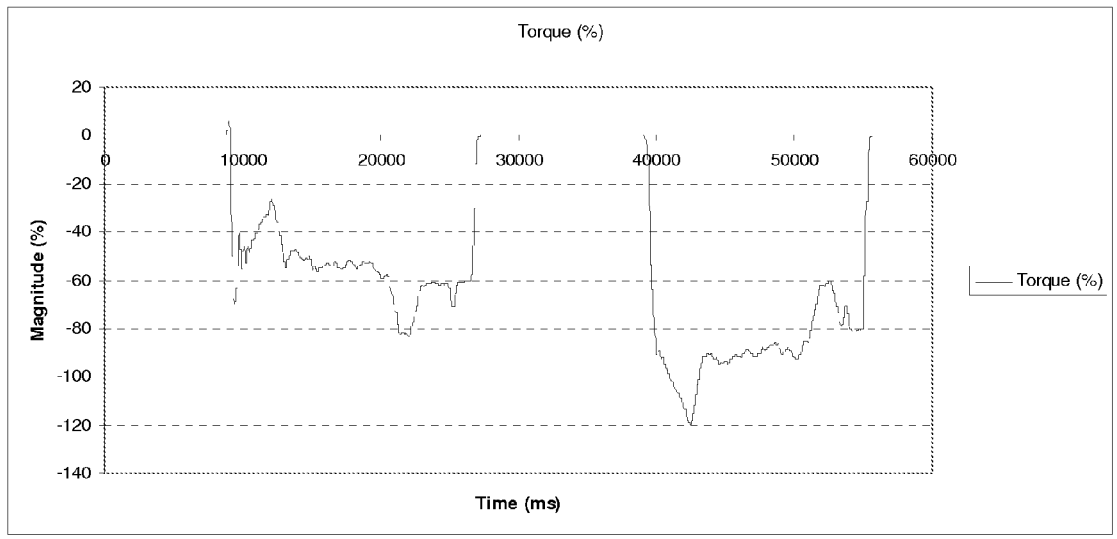
FIG. 3 illustrates electrical torque in a lift mechanism according to an example.
Figure 4:
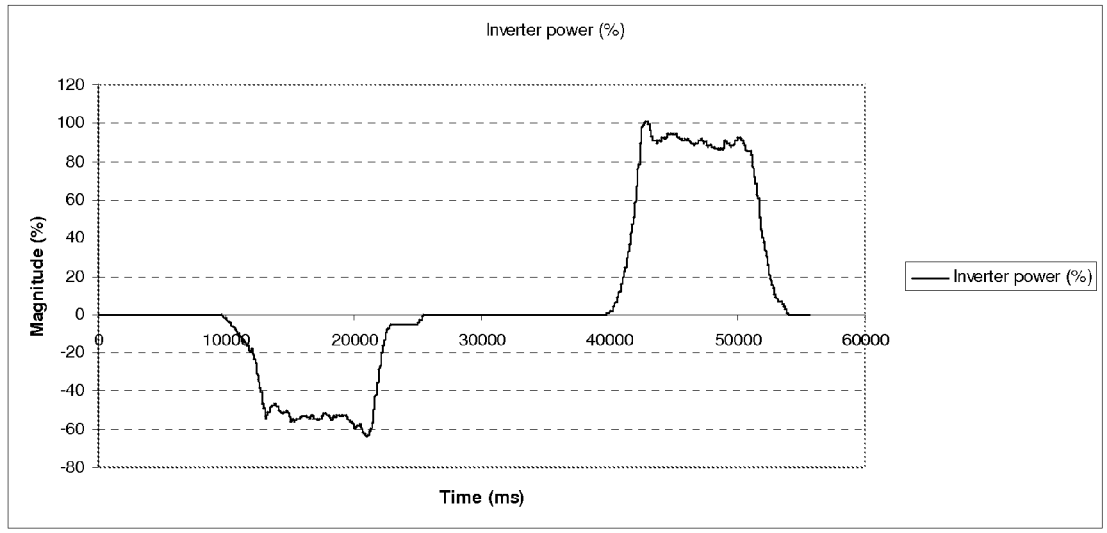
FIG. 4 illustrates inverter output power in a lift mechanism according to an example.
Figure 5:
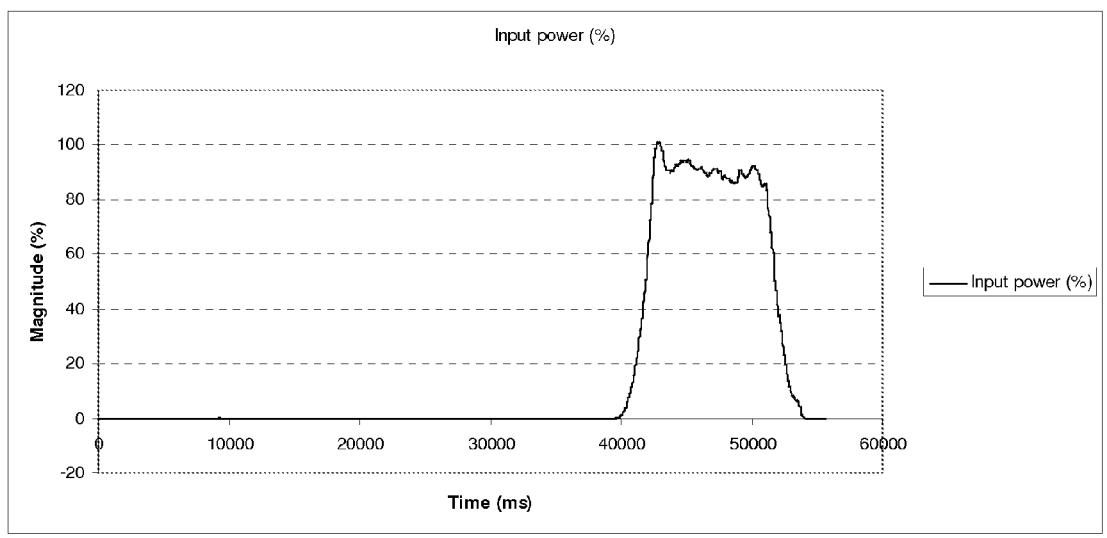
FIG. 5 illustrates input power in a lift mechanism according to an example.

Turning to FIGS. 2 to 5, an example profile measured in a passenger lift application, for a lift cycle of 60 seconds with the lift unloaded is illustrated. Complete ascent takes place from approximately zero to 30 seconds, and complete descent takes place from approximately 30 to 60 seconds. FIG. 2 illustrates motor 17 shaft speed, FIG. 3 illustrates electrical torque as estimated by processor 15 (by knowing the magnitude and phase of the current, the processor can estimate the electrical torque) of the inverter 13, FIG. 4 illustrates the inverter 13 output power, and FIG. 5 illustrates the inverter 13 input power. The waveforms of FIGS. 4 and 5 are calculated as the product of the torque and speed of motor 17.

Due to the counter-weight 20 and friction in the gearbox 18 of the lift mechanism, during ascent of the lift, the inverter output power (FIG. 4) is about −50% (i.e. overhauling) and the input power is zero (FIG. 5). During descent of the lift, the inverter output power and input power are both about 90%. In this example, the average power magnitude in the inverter 13 is in the region of 27% of its rating and the average input power is in the region of 17%, taken over a total time of 56 seconds as is calculated from FIGS. 4 and 5 respectively. The input power of about 90% is concentrated in a time segment (identified by reference numeral 50) of about 10 seconds out of the 56 seconds. The heat generated (i.e. dissipated) during the cycle in a component of the inverter drive, for example, a choke positioned for EMC/RFI purposes is estimated to be only 14% of its capability if it were rated for continuous use at maximum input power. Such an estimation of heat generated may be arrived at by taking the current as proportional to input power, and the heat generated as proportional to the square of current. (This approximation ignores second-order effects such as resistance change with temperature, and also ignores that the input current is not strictly proportional to power as it is not entirely linear due to the effect of the non-sinusoidal rectifier waveform as the skilled person would understand.)

Therefore, as can be seen from these calculations, input components may be down-rated and still meet the requirements of the system to avoid over-heating. This gives cost and sizing benefits to the design of the system.

The data of waveforms such as those of FIGS. 2 to 5 is available from a system of FIG. 1 without the introduction of additional temperature sensors as will be shown below.

Figure 6:
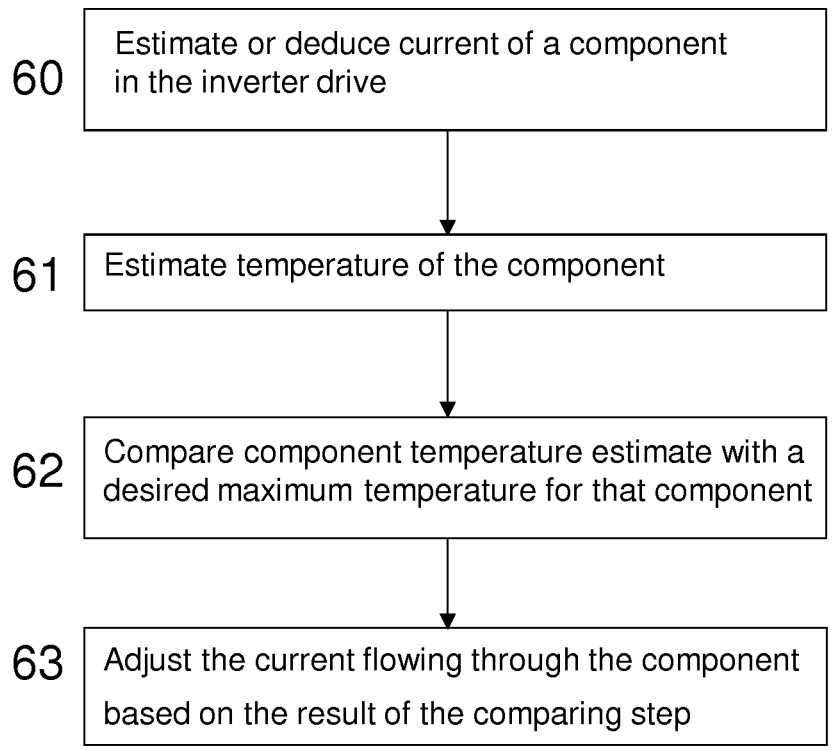
FIG. 6 illustrates a flow-chart of method steps according to an embodiment.

Turning to FIG. 6, an embodiment is illustrated as a flowchart of steps which may be carried out by processor 15 of controller 14. In relation to any one component of an inverter drive such as inverter 1, the relevant component current is estimated (step 60) from data available in the drive controller 14. Based on an understanding of the continuity of power flow within the inverter drive, this data is optionally:

Active (torque-producing) current or torque, as would be available for example in an inverter drive using closed-loop torque control Shaft speed of motor 17, or output frequency or voltage of the inverter 13

In an embodiment, the current estimate may be carried out by multiplying the active current by the shaft speed of motor 17 and a suitable scaling factor to give an estimate of the input power to motor 17 (the output power of inverter 13). The inverter drive input current 25, and hence the current through a particular component in the inverter drive such as the aforementioned choke or other EMC component is then estimated from the known relationship between input current and motor input power, obtained by measurement, simulation or calculation.

For example, when samples of the intended motor and drive are available, the relationship can be found by directly measuring the relevant currents in a load testing rig. In an alternative embodiment the model may be created using a circuit modelling language (for example SPICE) and the model run so as to derive the relationship and hence an appropriate scaling factor. Optionally, the model may be validated by comparing results with those obtained by measurement of a sample system in a loading rig.

If the motor input power is negative, i.e. the load is overhauling, then the drive input current is zero or close to zero.

Alternatively the current may be deduced from a measurement of the d.c. link current 12 if that is available.

In step 61 of FIG. 6, the temperature of the component in question is estimated by estimating its temperature rise based on the component current estimate obtained in step 60 using a suitable thermal model. In an alternative embodiment, this could be a mathematical model or look-up-table or algorithm based on the component's measured thermal response, as would be understood by the skilled person.

For example, a model could be based on a single thermal time constant, which could be calculated form the known mass and cooling curve of the component. More complex models with multiple time constants may be used, for example as are widely applied in the study of the dynamic temperature behaviour of semiconductor devices such as power transistors. The model parameters may be derived from the component manufacturers' data, or by measurement, or a combination of the two.

An allowance may be added for the local ambient temperature based on an existing measurement or a worst-case value or other technique.

In step 62, the component temperature estimate of step 61 is compared with a desired maximum temperature of that component. The desired maximum can be deduced from the manufacturer's data sheet or from measurements taken from a test rig, for example.

In step 63, the result of the comparison of step 62 is used to adapt or regulate the output of inverter drive 1, for example by setting a restriction on the available torque or acceleration or speed in the motor in order to regulate the temperature of the component by reducing the output power of the inverter 13, and therefore reducing the input current 21 of the inverter 13, and hence the current through the component in question is reduced. A reduction in the current through the component in turn reduces the power dissipated in that component and hence aids a temperature reduction in that component.

The algorithm used to restrict the drive speed, torque or acceleration may be by way of a proportional-derivative-integral (PID) control loop or other control technique as would be known to the skilled person.

For example, this action could be carried out by using any known techniques of feedback control systems. For example, a PI (proportional plus integral) controller could be used so that if the estimated temperature exceeds the desired temperature by an amount ΔT then the target parameter (for example torque limit or speed limit) is reduced by an amount given by:

$$\Delta a = k_p \Delta T + k_i \int \Delta T dt$$

where:
Δa is the control action (change in target parameter)
$k_p$ is the chosen proportional gain
$k_i$ is the chosen integral gain
t is time The resulting control action may then be subject to a limiting function to keep the target parameter within required bounds, for example an upper bound may be the normal drive operating limit and a lower bound may be the acceptable minimum torque or acceleration or speed.

These steps may be carried out on one or more components of the inverter drive in a parallel or serial manner so that the thermal performance of one or more components in the inverter drive can be taken into account when adjusting.

Instructions may be provided for processor 15, or another device such as a microcontroller or FPGA to carry out the above calculations by way of a computer readable medium such as but not limited to a compact disc, memory card, or a fixed memory device.

As has been shown, the temperature of inverter drive input-stage components can be estimated by using data available within the drive 1 or specifically, the drive controller 14. From an estimation of component current, the temperature of the component can be estimated, and the output power of the inverter can be suitably adjusted which in turn adjusts the input current of the inverter and hence the current through the component in question. This allows the heating effect on input components to be estimated and controlled. No additional sensors are required, either to measure component temperature or drive input current, for example.

Further, as has been shown, the comparison of the temperature estimate of one or more components with a desired maximum temperature for that component (step 62) can be used to regulate the drive output so as to restrict the output power and therefore the input current, whilst having only a small effect on the drive speed (stage 'a' as discussed earlier). This is because when torque or acceleration is restricted, the speed is only reduced during the acceleration phase.

This regulation provides a smooth effect on operation of the motor rather than a sudden trip with an accompanying sudden loss of all drive. Reducing the torque has the main effect of only reducing the acceleration which gives an intrinsically smooth regulation in relation to motor activity. Additionally, if the speed is to be reduced (stage 'b' as discussed earlier), preferably, a smooth control would be applied to the change of speed to avoid an abrupt change of speed at the motor. Such smooth control could be implemented in the control algorithm of the controller.

As a result of the above regulation of the output of inverter 13, operation of the load that the motor is driving is not significantly disrupted to the detriment of the user. For example, in a hoist embodiment, an adjustment to the acceleration of the hoist (driven by the motor) would not have a significant impact on the operation of the hoist. A reduction of the speed would result in slower operation, but would still avoid the disruption caused by a trip. This is in contrast to known systems where a simple over-temperature trip would cut all power to the load which would interrupt operation and could inconvenience an operator or user.

The present embodiments provide benefits, for example, the cost of parts is reduced as components of a lower current rating than are typically specified can be used (due to the realization that low-duty applications allow lower rated components and the aforementioned temperature control) which saves space without requiring any additional sensors or risking a forced shut-down (a trip situation). Negating the need for additional sensors also avoids increased likelihood of sensor malfunction or wearout and therefore avoids the reliability of the circuit being diminished in the pursuit of optimal component choice.

Further, sizing the inverter for the hottest credible environment is avoided (which allows benefits of cost-saving in both component procurement and manufacture). Still further, a trip is avoided (possibly trapping people in a lift for example) just because of a relatively minor fault such as a blocked air filter which could raise the ambient temperature of the system that could in turn, cause a localised overheating situation.

The invention claimed is:

1. A method of controlling a current flowing through a component of a drive arranged to drive a motor for a load comprising a hoist, crane or lift, the method comprising the steps of:
   estimating the current flowing through the component by deriving a shaft speed of the motor driven by the drive and multiplying a current that produces torque in the load by the shaft speed to provide an estimate of an input power of the motor driven by the drive;
   estimating a temperature of the component;
   comparing the estimated temperature with a desired maximum temperature for the component; and
   adjusting the current flowing through the component based on the result of the comparing step.

2. The method of claim 1 wherein the step of estimating the current comprises sampling torque produced in the load, or the current that produces torque in the load, driven by the drive.

3. The method of claim 1 wherein the step of estimating the current comprises sampling the output frequency of an inverter of the drive.

4. The method of claim 1 wherein the step of estimating the current comprises sampling the output voltage of an inverter of the drive.

5. The method of claim 1 wherein the step of estimating the current further comprises applying a scaling factor to the result of the multiplication.

6. The method of claim 5 wherein the step of estimating the current further comprises applying a known relationship between an input current of the drive and the input power of the motor.

7. The method of claim 1 wherein the step of estimating the current comprises measuring the current in a d.c. link of the drive.

8. The method of claim 1 wherein the step of estimating the temperature comprises estimating a temperature rise in the component based on the estimated current flowing through the component.

9. The method of claim 1 wherein the step of estimating the temperature is further based on ambient temperature.

10. The method of claim 1 wherein the step of adjusting the current comprises adjusting an output of an inverter of the drive.

11. The method of claim 10 wherein the step of adjusting the current comprises adjusting an output power of the inverter of the drive to adjust an input current of the inverter.

12. The method of claim 10 wherein adjusting the output of the inverter of the drive comprises restricting the speed of the motor driven by the drive.

13. The method of claim 10 wherein adjusting the output of the inverter of the drive comprises restricting an acceleration of the motor driven by the drive.

14. The method of claim 10 wherein adjusting the output of the inverter of the drive comprises restricting the torque of the motor driven by the drive.

15. A non-transitory computer readable medium comprising instructions that, when executed by a processor, cause the processor to carry out the method of claim 1.

16. An apparatus for controlling a current flowing through a component of a drive comprising means for carrying out the method of claim 1.

17. The apparatus of claim 16 wherein the means comprises a controller arranged to carry out the method of claim 1.

18. The apparatus of claim 17 further comprising an inverter and wherein the controller is a controller of the inverter.

* * * * *